(12) United States Patent
Kinch et al.

(10) Patent No.: US 11,692,622 B2
(45) Date of Patent: Jul. 4, 2023

(54) TRANSMISSION SHIFT WITH PRESSURE CONTROLLED CLEANING PULSES

(71) Applicant: FORD GLOBAL TECHNOLOGIES, LLC, Dearborn, MI (US)

(72) Inventors: Derek Kinch, Ypsilanti, MI (US); Joseph Scott Slayton, Stanwood, MI (US); Stephen Michael Cicala, Dearborn Heights, MI (US); Bradley D Riedle, Northville, MI (US); Richard Reynolds Hathaway, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 137 days.

(21) Appl. No.: 17/391,477

(22) Filed: Aug. 2, 2021

(65) Prior Publication Data

US 2023/0049036 A1 Feb. 16, 2023

(51) Int. Cl.
*F16H 61/12* (2010.01)
*F16H 61/00* (2006.01)
*F16H 61/02* (2006.01)
*F16H 61/30* (2006.01)
*F16H 61/682* (2006.01)

(52) U.S. Cl.
CPC ......... *F16H 61/12* (2013.01); *F16H 61/0025* (2013.01); *F16H 61/0276* (2013.01); *F16H 61/30* (2013.01); *F16H 61/682* (2013.01); *F16H 2061/1264* (2013.01)

(58) Field of Classification Search
CPC .. F16H 61/12; F16H 61/0025; F16H 61/0276; F16H 61/30; F16H 61/682; F16H 2061/1264

USPC .......................................................... 74/335
See application file for complete search history.

(56) References Cited

U.S. PATENT DOCUMENTS

| | | | | |
|---|---|---|---|---|
| 4,974,622 | A * | 12/1990 | Rader | F02D 41/20 251/129.05 |
| 5,202,813 | A * | 4/1993 | Uota | G05D 7/0635 700/282 |
| 5,422,556 | A * | 6/1995 | Graf | G05D 3/18 318/632 |
| 6,170,506 | B1 | 1/2001 | Butwin et al. | |
| 7,128,084 | B2 | 10/2006 | Long et al. | |
| 8,868,252 | B2 * | 10/2014 | Heap | B60W 10/02 701/84 |
| 9,097,337 | B2 * | 8/2015 | Sah | F16H 61/0025 |
| 9,140,337 | B2 * | 9/2015 | Sah | B60W 10/06 |

(Continued)

*Primary Examiner* — Ha Dinh Ho
(74) *Attorney, Agent, or Firm* — Vincent Mastrogiacomo; Brooks Kushman P.C.

(57) ABSTRACT

A transmission includes a gearing arrangement configured to shift speed ratios by disengaging an off-going shift element and engaging an oncoming shift element and an electrohydraulic valve having an actuatable valve element configured to control an engagement state of the oncoming shift element. A controller is programmed to, during a shift of the transmission, in response to the off-going shift element disengaging and an expected ratio change not initiating, monotonically increase current to the valve to a maximum value to overcome frictional resistance on the valve element, and programmed to, in response to expiration of a timer and the ratio change still not initiating, send a repeating pattern of high and low current signals according to a duty cycle to overcome frictional resistance of the valve element.

20 Claims, 5 Drawing Sheets

(56) References Cited

U.S. PATENT DOCUMENTS

| | | |
|---|---|---|
| 2005/0255967 A1 | 11/2005 | Foster et al. |
| 2009/0144002 A1* | 6/2009 | Zettel .................... G01R 31/50 |
| | | 324/426 |
| 2010/0298089 A1* | 11/2010 | Sah ....................... B60W 10/08 |
| | | 701/55 |

* cited by examiner

TRANSMISSION SHIFT WITH PRESSURE CONTROLLED CLEANING PULSES

TECHNICAL FIELD

This disclosure relates to automatic transmissions and more particularly to cleaning electrohydraulic valves during a transmission shift.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a higher speed ratio such that it multiplies the engine torque for improved acceleration. At high vehicle speed, operating the transmission at a lower speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

Discrete ratio transmissions are capable of transmitting power via various power flow paths, each associated with a different speed ratio. A particular power flow path is established by engaging particular shift elements, such as clutches or brakes. Shifting from one gear ratio to another involves changing which shift elements are engaged. In many transmissions, the torque capacity of each shift element is controlled by routing fluid to the shift elements at controlled pressure. A controller adjusts the pressure by sending electrical signals to a valve body.

SUMMARY

According to one embodiment, a transmission includes a gearing arrangement configured to shift speed ratios by disengaging an off-going shift element and engaging an oncoming shift element and includes an electrohydraulic valve having an actuatable valve element configured to control an engagement state of the oncoming shift element. A controller is programmed to, during a shift of the transmission, in response to the off-going shift element disengaging and an expected ratio change not initiating, monotonically increase current to the valve to a maximum value to overcome frictional resistance on the valve element, and programmed to, in response to expiration of a timer and the ratio change still not initiating, send a repeating pattern of high and low current signals according to a duty cycle to overcome frictional resistance of the valve element.

According to another embodiment, a transmission includes an input shaft, an output shaft, and a plurality of shift elements engageable in sets to create a plurality of power flow paths between the input and output shafts at different speed ratios. A hydraulic system is in fluid communication with the shift elements and has at least one electrohydraulic valve configured to control fluid pressure to at least one of the shift elements. A controller is in communication with the at least one valve and is programmed to, during a shift of the transmission: command a series of first pressures to a first of the valves associated with an oncoming one of the shift elements while an off-going one of the shift elements is engaged; command a series of second, higher pressures to the first valve for a duration of time responsive to an expected ratio change between the input and output shafts not commencing and the off-going shift element slipping; and command a series of pressure pulses, according to a duty cycle, to the first valve responsive to expiration of the duration of time and the expected ratio change not commencing.

According to yet another embodiment, a method of freeing a stuck electrohydraulic valve of a transmission includes commanding a series of first pressures to an electrohydraulic valve associated with an oncoming shift element of a transmission shift prior to an off-going shift element slipping; commanding a series of second, higher pressures to the valve for a duration of time responsive to an expected ratio change of the transmission not commencing and the off-going shift element slipping; and commanding a series of pressure pulses, according to a duty cycle, to the valve responsive to expiration of the duration of time and the expected ratio change not commencing.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
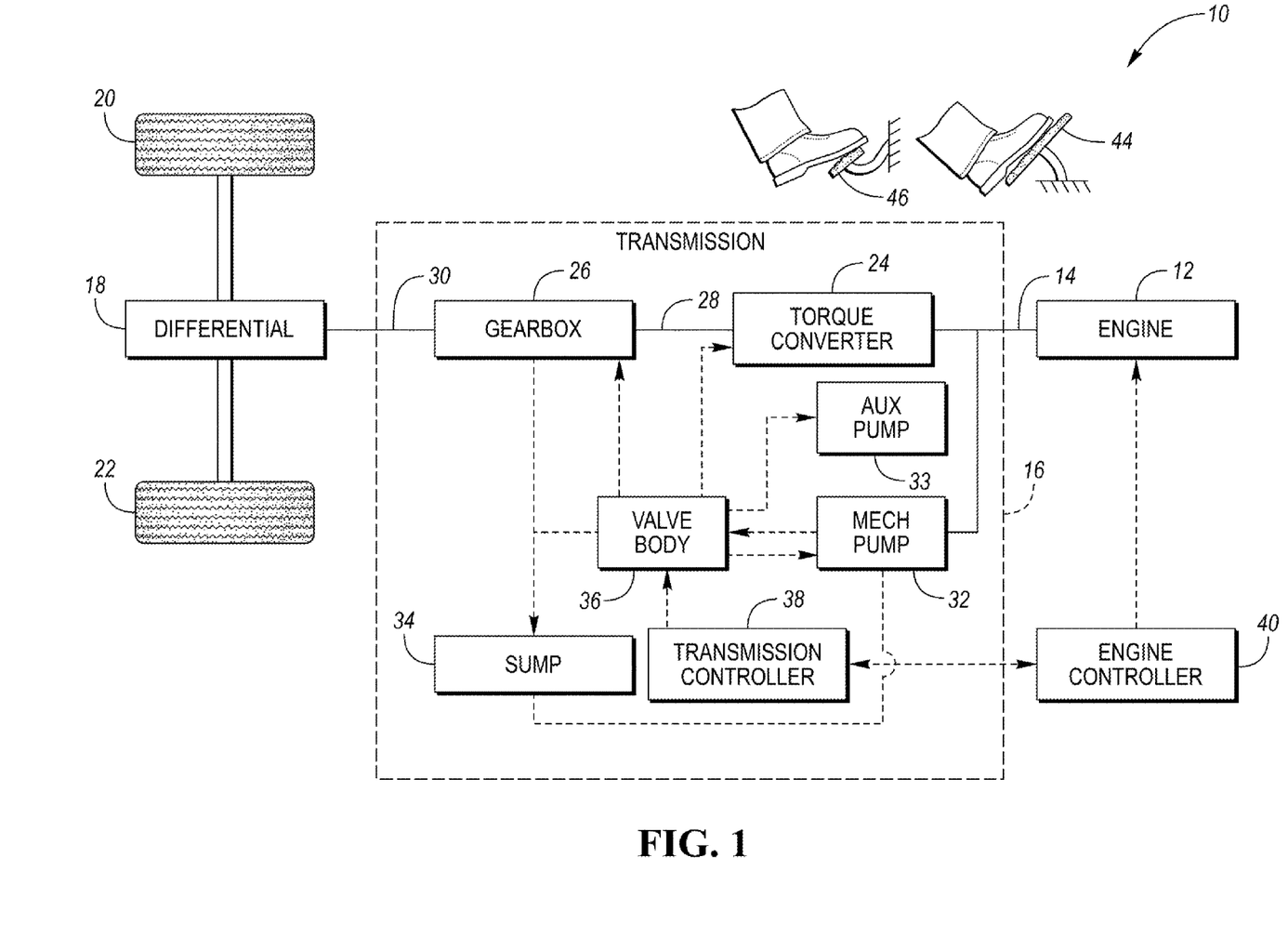
FIG. 1 is a schematic diagram of a vehicle powertrain.

FIG. 1 schematically illustrates a vehicle 10. Solid lines represent mechanical power flow connections; dashed lines represent the flow of hydraulic fluid or information signals. Power is provided by an actuator, such as internal combustion engine 12 or an electric motor. The transmission 16 adjusts the torque and speed to suit vehicle needs and delivers the power to a differential 18. The differential 18 transmits the power to left and right rear wheels 20 and 22, permitting slight speed differences as the vehicle turns a corner.

The transmission 16 includes a torque converter 24 and a gearbox 26. The torque converter 24 transmits torque hydrodynamically based on a speed difference between an impeller that is driven by crankshaft 14 and a turbine that drives a gearbox input shaft 28 (sometimes called a turbine shaft or a transmission input shaft). Power is transmitted from the impeller to the turbine via moving fluid whenever the impeller rotates faster than the turbine. The torque converter 24 may include a stator that redirects the fluid when the impeller is rotating substantially faster than the impeller such that the turbine torque is a multiple of the impeller torque. The gearbox 26 includes gearing and shift elements, e.g., clutches and brakes, configured to establish various power flow paths between the input shaft 28 and the output shaft 30. The term "clutch" is used generically herein to describe shift elements that couple two rotating components and to describe shift elements that couple a rotating component to a fixed component, e.g., a housing. (Some people refer to the latter as a "brake," but, for simplicity, it will be called a clutch in this disclosure.) Each power flow path may be established by engaging an associated subset of the shift elements. At low vehicle speed, a power flow path providing torque multiplication and speed reduction between the turbine shaft and the output shaft may be established to optimize vehicle performance. At higher vehicle speeds, a power flow path providing speed multiplication may be established to minimize fuel consumption.

The clutches within the gearbox 26 are engaged by supplying hydraulic fluid at an elevated pressure to a clutch apply chamber. Each clutch may include a clutch pack having friction plates splined to one component and interleaved with separator plates splined to a different component. The fluid forces a piston to squeeze the clutch pack such that frictional force between the friction plates and the separator plates couples the components. The torque capacity of each clutch varies in proportion to changes in the fluid pressure. A pump 32, driven by the crankshaft 14 or electrically, draws fluid from the sump 34 and delivers it at an elevated pressure to a valve body 36. The valve body 36 delivers the fluid to the clutch apply chambers at a pressure controlled in accordance with signals from a transmission controller 38. In addition to the fluid provided to the apply chambers, the valve body 34 provides fluid for lubrication and for the torque converter 24. The fluid eventually drains from the gearbox 26 back to the sump 34 at ambient pressure.

The transmission 16 includes one or more pumps to provide pressurized fluid to the valve body 36. For example, the vehicle 10 includes a pair of pumps 32 and 33. Pump 32 may be a primary pump that is more powerful than the secondary pump 33. For example, the primary pump 32 may have a higher hydraulic pressure rating than the auxiliary pump 33. The primary pump 32 may be a mechanical pump that is powered by the engine 12 and the auxiliary pump 33 may be an electric pump. The auxiliary pump 33 may be provided primarily to maintain hydraulic pressure when the vehicle is in a start-stop condition or in an electric-only mode. As will be described in detail below, the auxiliary pump 33 may also be used to operate the transmission during forward propulsion in limited circumstances and for a limited period of time. While the transmission pumps in the illustrated embodiments are a mechanical main pump and an electric auxiliary pump, this need not be the case and both pumps may be mechanical or electrical, or the main pump may be electrical and the auxiliary pump may be mechanical. In other embodiments, vehicle 10 may only include a single pump.

An engine controller 40 adjusts various actuators in the engine 12 to control the level of torque delivered at the crankshaft. For example, the controller 40 may adjust a throttle opening, fuel injection quantity and timing, spark timing, camshaft timing, or the like. The engine controller 40 may determine the desired level of wheel torque predominantly based on driver input via an accelerator pedal 44. The engine controller 40 is in communication with a transmission controller 38 and may adjust the torque output or speed based on requests from the transmission controller 38. The engine controller 40 and the transmission controller 38 may be separate microprocessors communicating via a controller area network or their various functions may be combined into a single microprocessor or split among more than two microprocessors.

The controllers 38 and 40 may be part of a larger control system and may be controlled by various other controllers throughout the vehicle, such as a vehicle system controller (VSC). It should therefore be understood that the controller 38, 40 and one or more other controllers can collectively be referred to as a "controller" that controls various actuators in response to signals from various sensors to control functions such as shifting the transmission, controlling engine torque, etc. Any recital of "a controller" refers to one or more controllers. The controller(s) may include a microprocessor or central processing unit (CPU) in communication with various types of computer-readable storage devices or media. Computer-readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle. The controller(s) communicates with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU.

The vehicle 10 may include an accelerator pedal 44 and a brake pedal 46 that may be in communication with one or more controllers, e.g., controllers 38 and/or 40. The accelerator pedal 44 may include a sensor configured to output an accelerator-pedal position signal. The controller is configured to interpret the signal as a driver-demanded torque. A lookup table, stored in memory of the controller(s) may correlate accelerator pedal position to driver-demanded torque based on one or more factors, such as vehicle speed. The controllers are configured to operate the engine to produce the driver-demanded torque during normal operation. During some situations, such as during a transmission shift, the controller may operate the engine to produce less than the driver-demanded torque, and in some instances, produce a negative engine torque. The brake pedal 46 may also include a sensor configured to output a brake-pedal position signal. The controller is configured to receive the brake-pedal position signal and determine a driver-requested braking torque, such as via another lookup table, that is commanded to the braking system of the vehicle.

Figure 2:
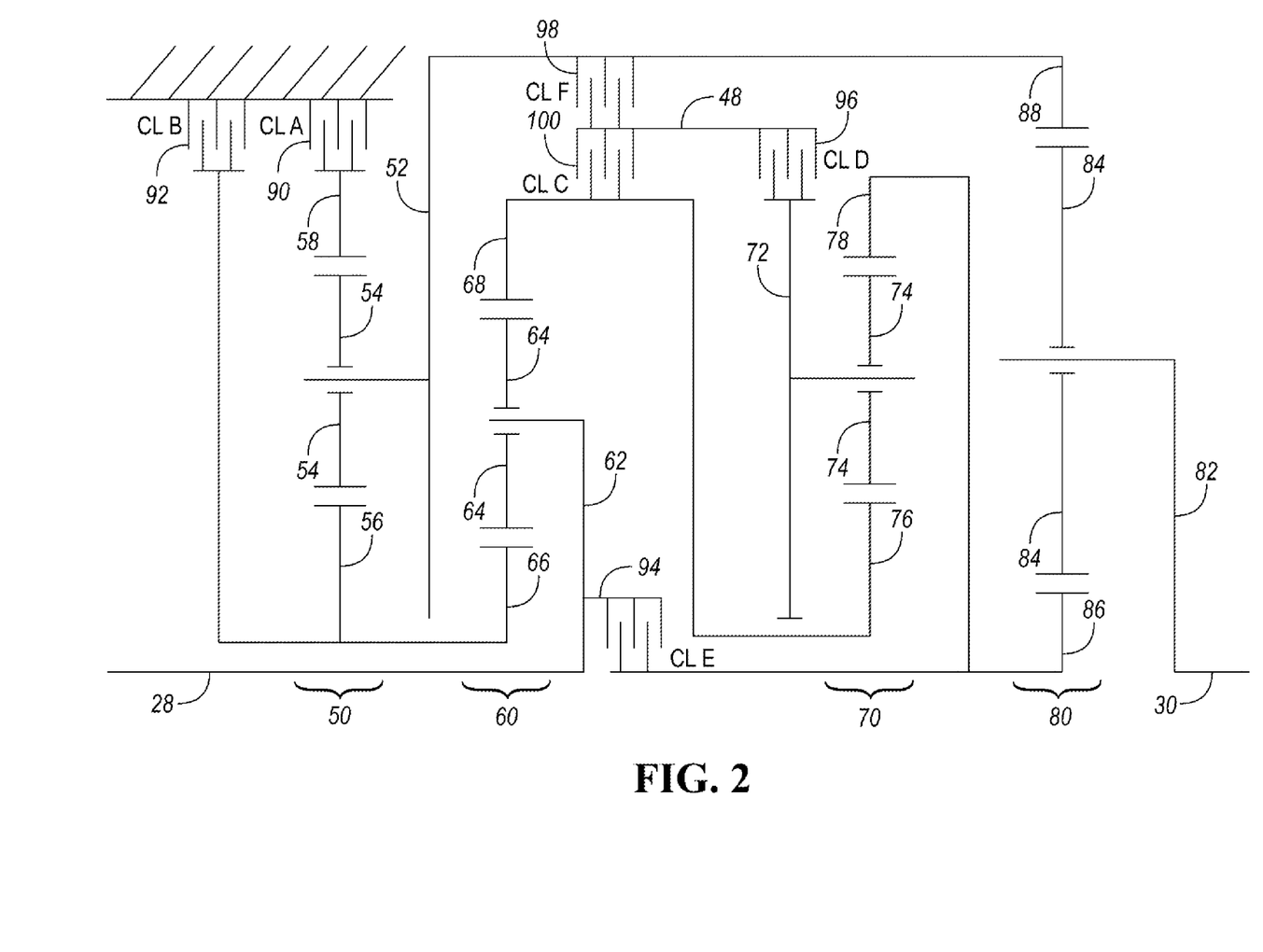
FIG. 2 is a schematic diagram of a transmission.

The transmission 16 may be a step-ratio automatic transmission as schematically illustrated in the example of FIG. 2. In this example, the transmission utilizes four simple planetary gear sets 50, 60, 70, and 80. Sun gear 56 is fixedly coupled to sun gear 52 is fixedly couple to ring gear 88, ring gear 68 is fixedly coupled to sun gear 76, ring gear 78 is fixedly coupled to sun gear 86, turbine shaft 28 is fixedly coupled to carrier 62, and output shaft 30 is fixedly coupled to carrier 82. Ring gear 58 is selectively held against rotation by brake 90 and sun gears 56 and 66 are selectively held against rotation by brake 92. Turbine shaft 28 is selectively coupled to ring gear 78 and sun gear 86 by clutch 94. Intermediate shaft 48 is selectively coupled to carrier 72 by clutch 96, selectively coupled to carrier 52 and ring gear 88 by clutch 98, and selectively coupled to ring gear 68 and sun gear 76 by clutch 100. A suggested ratio of gear teeth for each planetary gear set is listed in Table 1.

TABLE 1

| | |
|---|---|
| Ring 58/Sun 56 | 2.20 |
| Ring 68/Sun 66 | 1.75 |
| Ring 78/Sun 76 | 1.60 |
| Ring 88/Sun 86 | 3.70 |

As shown in Table 2, engaging the clutches in combinations of four establishes ten forward speed ratios (also referred to as gears or gear ratios) and one reverse speed ratio between the turbine shaft 28 and the output shaft 30. An X indicates that the clutch is required to establish the speed ratio. An (X) indicates the clutch can be applied but is not required to establish the power flow path. In first gear, either clutch 98 or clutch 100 can be applied instead of applying clutch 96 without changing the speed ratio. When the gear sets have tooth numbers as indicated in Table 1, the speed ratios have the values indicated in Table 2. Of course, this is just one example.

TABLE 2

| | A 90 | B 92 | C 100 | D 96 | E 94 | F 98 | Ratio | Step |
|---|---|---|---|---|---|---|---|---|
| Rev | X | X | | X | | X | −4.79 | 102% |
| 1st | X | X | | (X) | X | | 4.70 | |
| 2nd | X | X | X | X | | | 2.99 | 1.57 |
| 3rd | X | | X | X | X | | 2.18 | 1.37 |
| 4th | X | | X | X | | X | 1.80 | 1.21 |
| 5th | X | | X | | X | X | 1.54 | 1.17 |
| 6th | X | | | X | X | X | 1.29 | 1.19 |
| 7th | | | X | X | X | X | 1.00 | 1.29 |
| 8th | | X | | X | X | X | 0.85 | 1.17 |
| 9th | | X | X | | X | X | 0.69 | 1.24 |
| 10th | | X | X | X | | X | 0.64 | 1.08 |

In operation, clutches 90, 92, 96, and 94 may be engaged while the vehicle is stopped in Drive such that the vehicle is launched in first gear. When the vehicle reaches a sufficient speed, the transmission is shifted into second gear by releasing clutch 94 and engaging clutch 100. For this shift, clutch 94 is called the off-going clutch (OFG) and clutch 100 is called the oncoming clutch (ONC). To effectuate the shift, the controller adjusts the pressures supplied to the apply chambers of these two clutches by controlling hydraulic valves associated with the OFG and ONC and modulates the engine torque.

Figure 3:
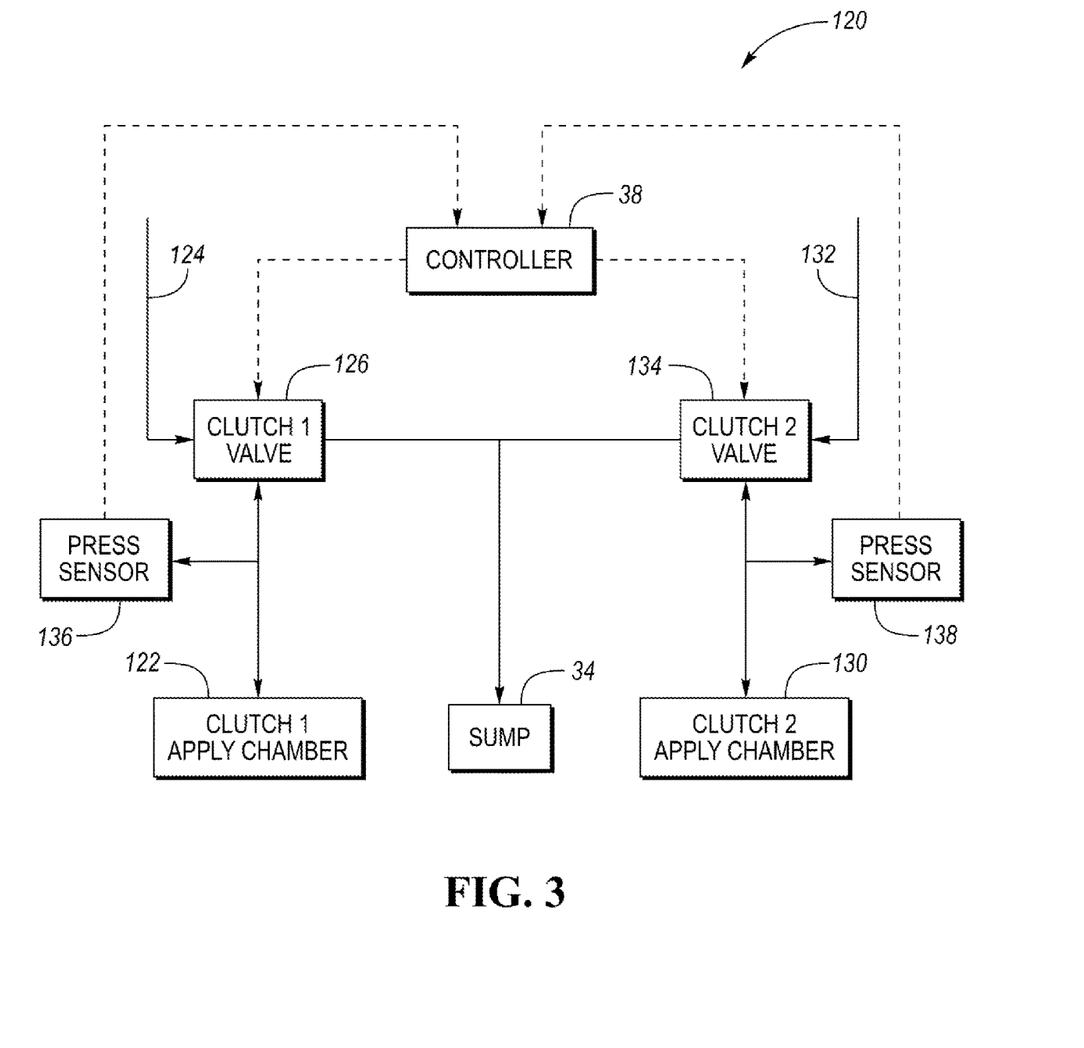
FIG. 3 is a schematic diagram of a hydraulic system of the transmission.

FIG. 3 schematically illustrates a portion of a hydraulic system 120 for controlling clutches of the transmission. The clutch apply chamber 122 of a first shift element (clutch 1) is supplied from line 124. To engage the first shift element, the controller commands electrohydraulic valve 126 to set the pressure of the clutch apply chamber 122 to a value between zero and the pressure in line 124 (maximum pressure). The controller adjusts the pressure by adjusting a current to a solenoid in valve 126. When the current is set to zero, valve 126 isolates the clutch apply chamber 122 from line 124 and connects the clutch apply chamber 122 to the sump 34 thereby allowing the fluid to escape to release the first clutch. Although a single valve is shown for simplicity, the system may include a latch valve or other supplemental valves.

Similarly, the clutch apply chamber 130 of a second shift elements is supplied from the line 132 via an electrohydraulic valve 134. To engage the second shift element (clutch 2), the controller commands valve 134 to set the pressure of the clutch apply chamber 130 to a value between zero and the pressure in line 132. The controller 38 adjusts the pressure by adjusting a current to a solenoid in valve 134. When the current is set to zero, valve 134 isolates the clutch apply chamber 130 from line 132 and connects clutch apply chamber 130 to sump 34 thereby allowing the fluid to escape to release the second clutch. Additional shift elements are controlled similarly.

Pressure sensors 136 and 138 measure the fluid pressure in clutch apply chambers 122 and 130, respectively, and report the pressure to controller 38. During shifting, this information helps controller 38 set the clutch torque more accurately. Clutch pressure sensors may be present for some clutches but not for others.

The electrohydraulic valve, e.g., valve 126, may include a spool valve that is supported for movement within a valve body. The spool valve is mechanically connected to the solenoid, which actuates the position of the spool valve based on a current signal received by the solenoid. For example, the controller may be configured to send a current signal to the solenoid between zero and one ampere (different currents may be used in other embodiments). A current of zero may result in the valve isolating the clutch apply chamber from the line pressure (e.g., a closed position with zero pressure) and a current signal of one ampere may result in the valve supplying line pressure to the clutch (e.g., a fully open position with maximum pressure).

During shifting of the transmission, the clutches are controlled to desired clutch torque capacity by commanding desired pressures to the valves, which may be in the form of current sent from the controller to the solenoids. The output pressures of the valves to the clutches are determined by a transfer function that correlates pressure with current. In most transfer functions, the pressure monotonically increases with current, although the increase may or may not be linear.

Oil-born contaminants within the hydraulic circuit can affect operation of the electrohydraulic valves, which in turn, may affect shift quality of the transmission. The contaminants may inhibit actuation of the valve due to increased friction between the moving element, e.g., the spool valve, and the valve housing. This can result in the valve becoming stuck in an OFF or fully closed position. A stuck-off valve inhibits the ability of the associated clutch to engage during a shift event. In some instances, the stuck-off (or frozen) valve may not be due to contaminants but due to cold temperatures or a new transmission that is not yet broken in.

An electrohydraulic valve may become unstuck (freed) without requiring service depending upon severity of the contamination. As will be discussed in more detail below, a controller may be programmed to perform a routine, a decontamination routine, that increases the pressure commanded to the stuck-off valve to free the actuatable element and return that valve to full operational condition without requiring any service. For example, when a valve is suspected of being stuck-off during a shift where the valve controls the oncoming clutch, extra current may be commanded (ramped in and/or in pulses) to the that valve to free the moving element e.g., a spool valve.

To provide seamless operation of the transmission, the decontamination routine may be executed during a shift event if entry conditions are met or may be performed for static engagements such as when the transmission is in NEUTRAL. For example, the decontamination routine may be executed on a stuck-off valve associated with the oncoming clutch during a power-on upshift or a power-off downshift. A power-on upshift is an upshift that occurs when the driver-demanded torque is above a threshold. A power-off downshift is a downshift that occurs when the driver-demanded torque is below threshold.

Figure 4:
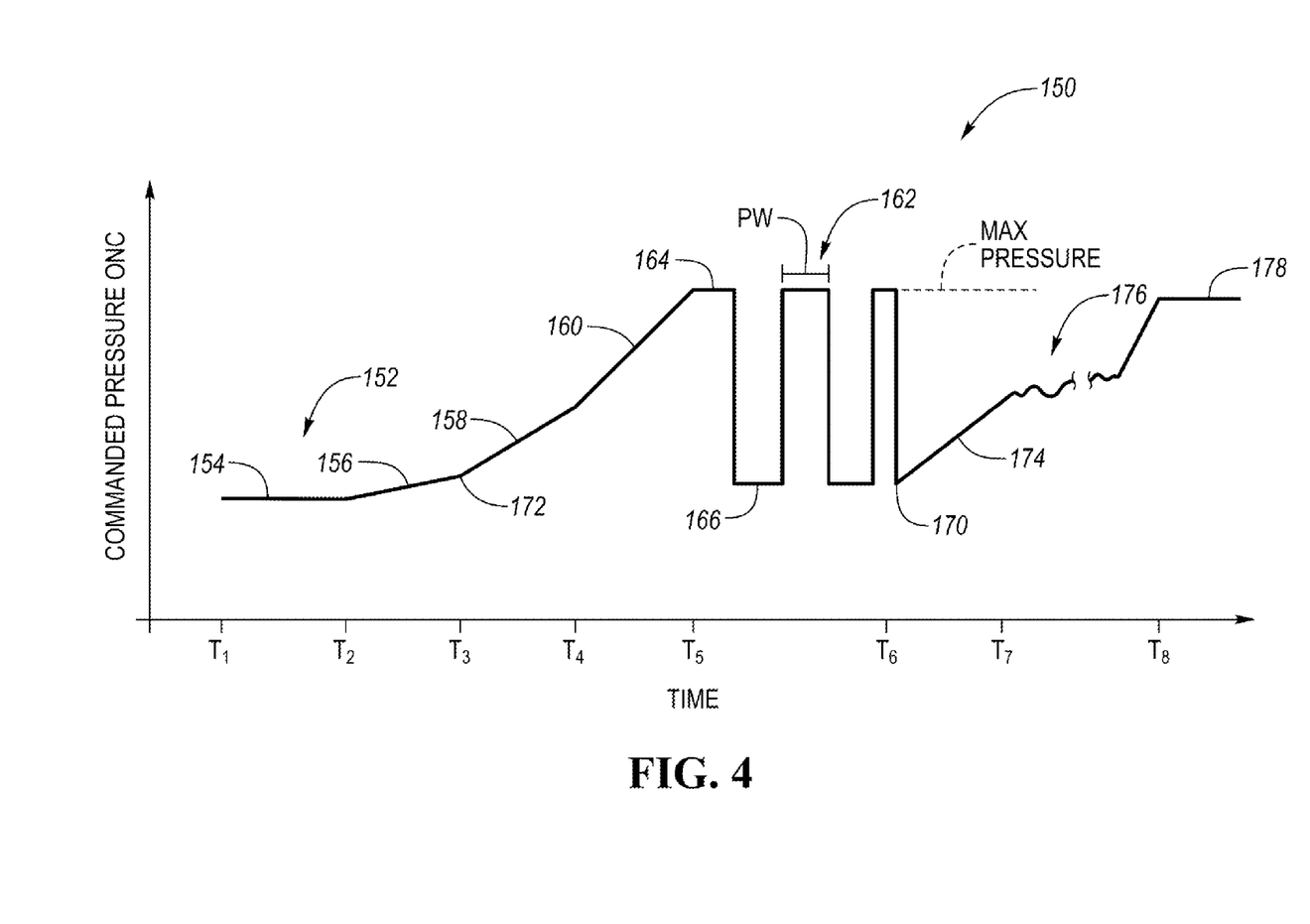
FIG. 4 is a plot of commanded pressures to an oncoming clutch during an example transmission shift that utilizes cleaning pulses according to one or more aspects of this disclosure.

FIG. 4 illustrates an example shift 150 in which the decontamination routine is used to unstick the valve of the oncoming clutch. The diagram shows the pressures commanded to the oncoming clutch (not actual pressures in the apply chamber, although these two values should be close). At time $T_1$, a stroke phase 152 begins and a stroke pressure 154 is commanded to the oncoming clutch. The stroke phase 152 continues until time $T_2$, where the pressure commanded to the oncoming clutch is increased according to a first ramp pressure to begin the torque transfer phase. Between times $T_2$ and $T_3$ a series of first pressures 156 are commanded to monotonically increase the pressure according to the first ramp rate. (Here, "rate" refers to the rate of change of the pressure commands, e.g., the slope of the line between $T_2$ and $T_3$.) The series of first pressures 156 may be commanded for a predetermined amount of time, which is the time period between times $T_2$ and $T_3$. By time $T_3$, a ratio change should be stating, that is the speed ratio between the transmission input and output shafts should begin to change from the offgoing speed ratio (gear) to the oncoming speed ratio (gear). Here, however, the expected ratio change does not commence due to the valve associated with the oncoming clutch being stuck-off. As such, the pressure is increased. The controller may determine a ratio change by monitoring a speed sensor associated with the input shaft and a speed sensor associated with the output shaft (or by inferred speeds of the input and output shafts).

At time $T_3$, the controller increases the ramp rate and commands a series of second pressures 158 that are greater than the first pressures 156. The second pressures 158 are commended such that the pressures commanded to oncoming clutch monotonically increases according to a second ramp rate that is higher than the first. The second series of pressures 158 may be commanded until the controller verifies slip at the off-going clutch, which in the illustrated embodiment, occurs at time $T_4$. The transmission may include speed sensors that are used to detect off-going clutch slip. Once clutch slip is detected, transmission tie up is no longer a concern and the pressure commanded to the oncoming clutch can be increased aggressively.

If at time $T_4$, the ratio change has still not commenced as expected, a series of third pressures 160 are commanded. That is, in response to detected off-going clutch slip and an expected ratio change not commencing, the controller commands a series of third pressures 160 that monotonically increase to the maximum pressure (which is the fully open valve position). The third pressures 160 are much higher than the second pressures 158. The third pressures 160 aggressively ramp according to third ramp rate to increase the commanded pressure to the valve in an attempt to free the stuck valve element, e.g., spool valve, and/or remove the commination. If successful, the ratio change starts and the clutch pressure control returns to normal operation. Normal operation controls the ratio change to the desired rate, duration, and shift feel It may include three main components to determine clutch pressure: 1) an open loop term based on the transmission input torque with inertia compensation, 2) feedback control on the clutch pressure based on turbine speed or turbine rate, and 3) some form of engine torque control.

The third pressures 160 may be commended for a predetermined amount of time or until the valve fully opens (maximum pressure is commanded). In the illustrated example, the series of pressures 160 are unable to unstick the valve and the clutch pressure reaches a maximum pressure (fully open valve position) at time $T_5$, which may coincide with expiration of the timer associated with the third pressures 160. Since the valve remains stuck, capacity is not being generated at the oncoming clutch element, and as such, the ratio change has still not commenced.

At time $T_5$, responsive to expiration of the timer and the expected ratio change not commencing, the controller begins commanding pressure pulses 162 in an attempt to unstick the valve. The series of pressure pulses 162 may be between high pulses 164 and low pulses 166. The high pluses 164 may be a pressure corresponding to an upper current (e.g., maximum current) and the lower pluses correspond to a lower current (e.g., a current sufficient to generate capacity at the oncoming clutch). This pulsing between high and low current causes the solenoid to produce a hammering effect on the actuatable valve element and hopefully free it. The controller commands the series of pressure pulses according to a duty cycle, which may be predetermined, that represents the fraction of one period in which the upper current is active. In the illustrated embodiment, a 50% duty cycle is shown, however, the duty cycle may be increased or decreased in other embodiments. The pulse width (PW) of the high current may be between 30 and 100 milliseconds for example. The pressure pulses 162 are not to be confused with dither, which is a very high frequency (e.g., 50-200 Hz), small amplitude current superimposed on the transfer function curve. A dither may be superimposed on the shown commanded pressures as is known in the art.

In the illustrated example, the pressure pulses are successful in unsticking the valve at time $T_6$. The controller may determine unsticking of the valve in response to sensing a change in the ratio. In response, the pressure pulses are ended, and the controller commands a pressure 170 that may correspond to the first pressure 172 of the second ramping pressures 158. Pressure 170 corresponds to a torque capacity sufficient to start the shift. The controller then commands a series of fourth pressures 174 to transfer torque from the off-going clutch to the oncoming clutch. At time $T_7$, torque transfer is complete and the inertia phase 176 begins. The shift is complete at time $T_8$ and the controller commands maximum pressure 178 fully lock on the oncoming clutch.

The pressure pulses 162 may be commanded for a predetermined amount of time. If the ratio change does not occur during this time. The controller may exit the shift and go back to the previous gear. The controller may reattempt to shift to the gear again for one or more times before issuing a diagnostic code and avoiding use of the clutch associated with the stuck valve.

Control logic or functions performed by controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 5:
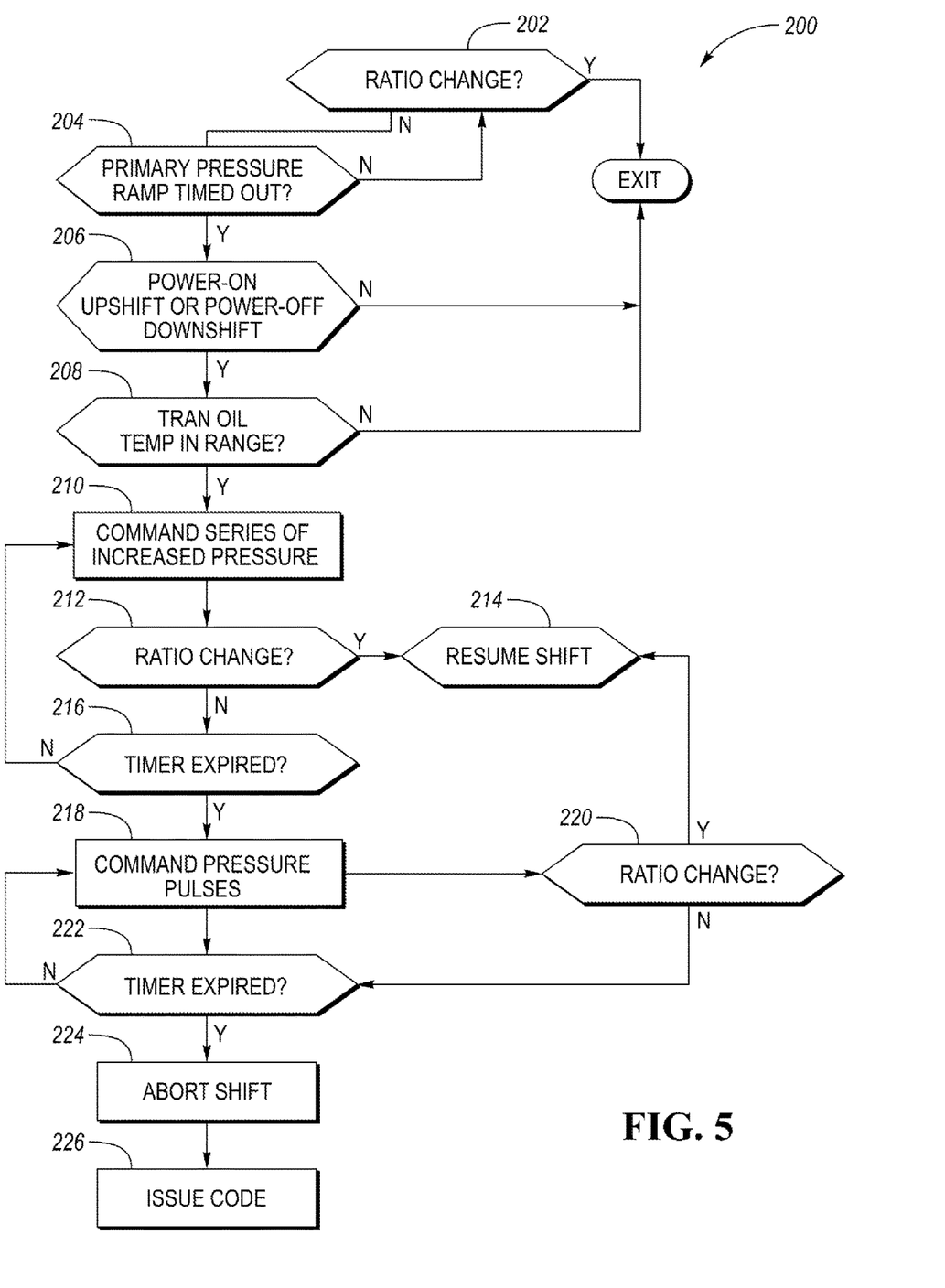
FIG. 5 is a flow chart of an algorithm for cleaning electrohydraulic valves during a transmission shift.

FIG. 5 is a flowchart 200 of an algorithm for controlling pressures commanded to the oncoming shift element during a transmission shift when a valve associated with the oncoming shift element is suspected of being stuck-off. Control begins at operation 202 where the controller determines if a ratio change of the transmission is detected. If yes, the shift is progressing as normal and this routine ends in lieu of the normal shift routine. If no, control passes to operation 204 where the controller determines if primary torque transfer pressure, e.g., the second series of pressures 158, has timed out. If no, control passes to operation 202 and the controller determines if the ratio change is detected. If yes, the shift is now proceeding as normal and the routine ends. If no, control loops back to operation 204 until the timer expires. At operation 206, the controller determines if the transmission shift is a power-on upshift or a power-off downshift. If no, the routine ends as the oncoming clutch does not control the shift. If yes, control proceeds to operation 208. If the oil temperature of the transmission is outside of a range, such as between 0 and 120 degrees Celsius, the routine ends.

Operations 202 through 208 are used to determine if the valve associated with the oncoming clutch is stuck-off and that all necessary parameters for operating in the decontamination routine are met. The decontamination routine commences at operation 210 where the controller commands a series of increased pressures, e.g., pressures 160. During this series of pressures, the controller monitors the ratio change at operation 212, and if a ratio change is sensed, the controller resumes normal shift at operation 214 as the valve has become unstuck. If the ratio change is not sensed, the series of pressures continues until a timer 216 expires, at which point the pressure pulses begin at operation 218. The pressure pulses continue until either a ratio change is sensed at operation 220 (the decontamination routine successfully unstuck the valve) or until another timer expires at operation 222. If the increased pressure in the pressure pulses does not free the valve, the shift is aborted at operation 224 and the transmission is shifted back to the previous gear. The controller may attempt to shift the transmission multiple times before issuing a diagnostic code at operation 226 to ensure that the valve is truly stuck.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A transmission comprising:
an input shaft;
an output shaft;
a plurality of shift elements engageable in sets to create a plurality of power flow paths between the input and output shafts at different speed ratios;
a hydraulic system in fluid communication with the shift elements and including at least one electrohydraulic valve configured to control fluid pressure to at least one of the shift elements; and
a controller in communication with the at least one valve and programmed to, during a shift of the transmission:
command a series of first pressures to a first of the valves associated with an oncoming one of the shift elements while an off-going one of the shift elements is engaged,
command a series of second, higher pressures to the first valve for a duration of time responsive to an expected ratio change between the input and output shafts not commencing and the off-going shift element slipping, and
command a series of pressure pulses, according to a duty cycle, to the first valve responsive to expiration of the duration of time and the expected ratio change not commencing.

2. The transmission of claim 1, wherein the duty cycle is predetermined.

3. The transmission of claim 1, wherein the pressure pulses include a high pulse and a low pulse, and wherein the high pulse is a maximum pressure associated with the first valve.

4. The transmission of claim 3, wherein the duty cycle is at least 50 percent high pulse.

5. The transmission of claim 3, wherein the low plus is equal to an initial pressure of the series of first pressures.

6. The transmission of claim 1, wherein at least one of the series of second, higher pressures is equal to a maximum pressure associated with the first valve.

7. The transmission of claim 1, wherein the series of second pressures increases monotonically.

8. The transmission of claim 1, wherein the series of first and second pressures are commanded for a predetermined duration of time.

9. The transmission of claim 1, wherein the controller is further programmed to, responsive to the series of pressure pulses resulting in a ratio change between the input and output shafts, command a series of third pressures to the first valve that is less than the series of second pressures to engage the oncoming clutch.

10. The transmission of claim 1, wherein the controller is further programmed to, responsive to the series of second pressures resulting in a ratio change between the input and output shafts, command a series of third pressures to the first valve that is less than the series of second pressures to engage the oncoming clutch.

11. The transmission of claim 1, wherein the controller is further programmed to, responsive to the series of pressure pulses not resulting in a ratio change between the input and output shafts within a duration of time, abandon the shift.

12. A method of freeing a stuck electrohydraulic valve of a transmission, the method comprising:

commanding a series of first pressures to an electrohydraulic valve associated with an oncoming shift element of a transmission shift prior to an off-going shift element slipping;

commanding a series of second, higher pressures to the valve for a duration of time responsive to an expected ratio change of the transmission not commencing and the off-going shift element slipping; and commanding a series of pressure pulses, according to a duty cycle, to the valve responsive to expiration of the duration of time and the expected ratio change not commencing.

13. The method of claim 12 further comprising:
responsive to the series of pressure pulses resulting in a ratio change of the transmission, commanding a series of third pressures to the valve that is less than the series of second pressures.

14. The method of claim 12 further comprising:
responsive to the series of second pressures resulting in a ratio change of the transmission, commanding a series of third pressures to the first valve to is less than the series of second pressures.

15. The method of claim 12 further comprising:
responsive to the series of pressure pulses not resulting in a ratio change of the transmission within a duration of time, aborting the shift.

16. The method of claim 12 further comprising:
responsive to the series of pressure pulses not resulting in a ratio change of the transmission within a duration of time, issuing a diagnostic code.

17. The method of claim 12, wherein the series of second pressures increases monotonically.

18. A transmission comprising:
a gearing arrangement configured to shift speed ratios by disengaging an off-going shift element and engaging an oncoming shift element;
an electrohydraulic valve including an actuatable valve element configured to control an engagement state of the oncoming shift element; and
a controller programmed to, during a shift of the transmission:
in response to the off-going shift element disengaging and an expected ratio change not initiating, monotonically increase current to the valve to a maximum value to overcome frictional resistance on the valve element, and
in response to expiration of a timer and the ratio change still not initiating, send a repeating pattern of high and low current signals according to a duty cycle to overcome frictional resistance of the valve element.

19. The transmission of claim 18, wherein high current signal is at a maximum value.

20. The transmission of claim 18, wherein the controller is further programmed to, responsive to the pattern of high and low current signals not producing the expected ratio change within a duration of time, abort the shift.

* * * * *